(12) United States Patent  
Peterson et al.

(10) Patent No.: US 10,252,154 B2
(45) Date of Patent: Apr. 9, 2019

(54) SYSTEMS AND METHODS FOR PRESENTATION OF CONTENT AT HEADSET BASED ON RATING

(71) Applicant: Lenovo (Singapore) Pte. Ltd., New Tech Park (SG)

(72) Inventors: Nathan J. Peterson, Oxford, NC (US); Russell Speight VanBlon, Raleigh, NC (US); John Carl Mese, Cary, NC (US); Arnold S. Weksler, Raleigh, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 146 days.

(21) Appl. No.: 15/366,711

(22) Filed: Dec. 1, 2016

(65) Prior Publication Data

US 2018/0154253 A1 Jun. 7, 2018

(51) Int. Cl.
*A63F 13/25* (2014.01)
*A63F 13/355* (2014.01)
*A63F 13/79* (2014.01)
*H04L 29/06* (2006.01)
*H04L 29/08* (2006.01)

(52) U.S. Cl.
CPC ............ *A63F 13/25* (2014.09); *A63F 13/355* (2014.09); *A63F 13/79* (2014.09); *H04L 65/4069* (2013.01); *A63F 2300/8082* (2013.01); *H04L 67/306* (2013.01)

(58) Field of Classification Search
CPC ............... H04L 65/4069; H04L 67/306; A63F 2300/8082
See application file for complete search history.

(56) References Cited

U.S. PATENT DOCUMENTS

| | | | |
|---|---|---|---|
| 2013/0079132 A1* | 3/2013 | Archer | A63F 13/358 463/31 |
| 2014/0128161 A1* | 5/2014 | Latta | A63F 13/06 463/42 |
| 2015/0057071 A1* | 2/2015 | Paquet | A63F 13/40 463/23 |

* cited by examiner

*Primary Examiner* — Robert T Clarke, Jr.
(74) *Attorney, Agent, or Firm* — John L. Rogitz; John M. Rogitz

(57) ABSTRACT

In one aspect, a device includes a processor and storage accessible to the processor. The storage bears instructions executable by the processor to determine a user of a headset and transmit, based on the determination of the user, a first portion of content of a first rating to the headset for presentation at the headset concurrently with presentation of a second portion of the content on a display separate from the headset. The second portion is of a second rating different from the first rating of the first portion.

26 Claims, 6 Drawing Sheets

SYSTEMS AND METHODS FOR PRESENTATION OF CONTENT AT HEADSET BASED ON RATING

BACKGROUND

As recognized herein, some video games may be especially violent or disturbing to younger players. However, sometimes older players may wish to play video games with these younger players even if the video game is violent, such as a father wanting to play a first person shooter game but still wanting his son to play with him. Typically, the father would have to choose between playing the first person shooter game or playing another game that is less violent and hence more suitable for his son. There are currently no adequate solutions to the foregoing computer-related problem.

SUMMARY

Accordingly, in one aspect a headset includes a housing, a processor coupled to the housing, a first display coupled to the housing and accessible to the processor, and storage coupled to the housing and accessible to the processor. The storage bears instructions executable by the processor to identify a rating associated with content, a first portion of which is being presented on a second display or will be presented on the second display. The storage also bears instructions executable by the processor to identify a user of the headset, transmit data to a device based on the identification of the rating and based on the identification of the user, receive a second portion of the content at the headset, and present the second portion at the headset at least in part using the first display.

In another aspect, a method includes identifying a rating for content, with a first portion of the content being presented on a first display or to be presented on the display. The method also includes identifying a user of a headset and transmitting, based on the identifying of the user, a second portion of the content to a headset.

In still another aspect, a computer readable storage medium (CRSM) that is not a transitory signal includes instructions executable by a processor to determine a user of a headset. The instructions are also executable to stream, based on the determination of the user, first content of a first rating to the headset for presentation at the headset concurrently with presentation of second content on a display separate from the headset. The first and the second content are both associated with a video game, and the second content is of a second rating different from the first rating.

In yet another aspect, a device includes a processor and storage accessible to the processor. The storage bears instructions executable by the processor to determine a user of a headset and stream, based on the determination of the user, first content of a first rating to the headset for presentation at the headset concurrently with presentation of second content on a display separate from the headset. The second content is of a second rating different from the first rating.

The details of present principles, both as to their structure and operation, can best be understood in reference to the accompanying drawings, in which like reference numerals refer to like parts, and in which:

DETAILED DESCRIPTION

Figure 1:
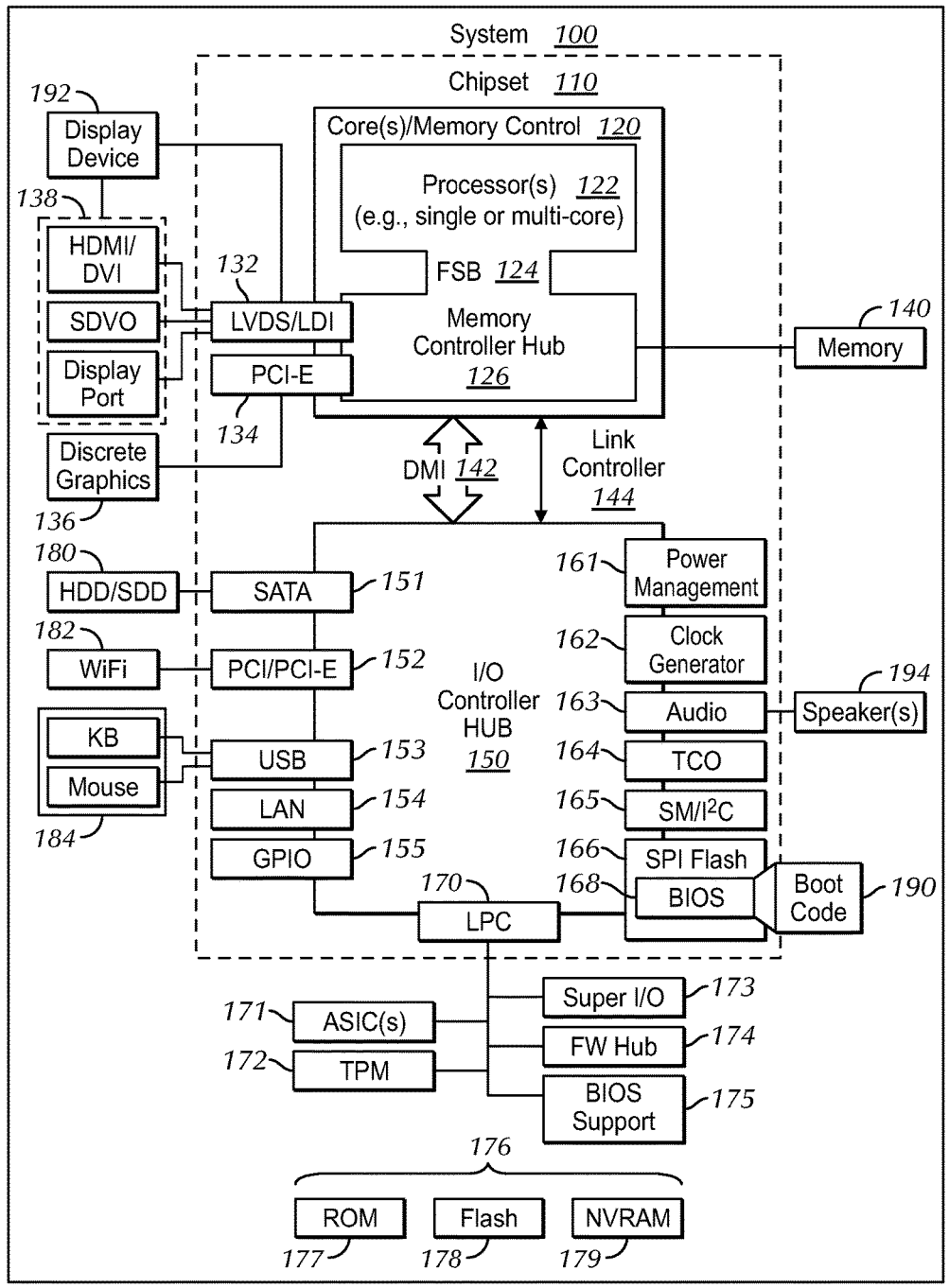
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM)

179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
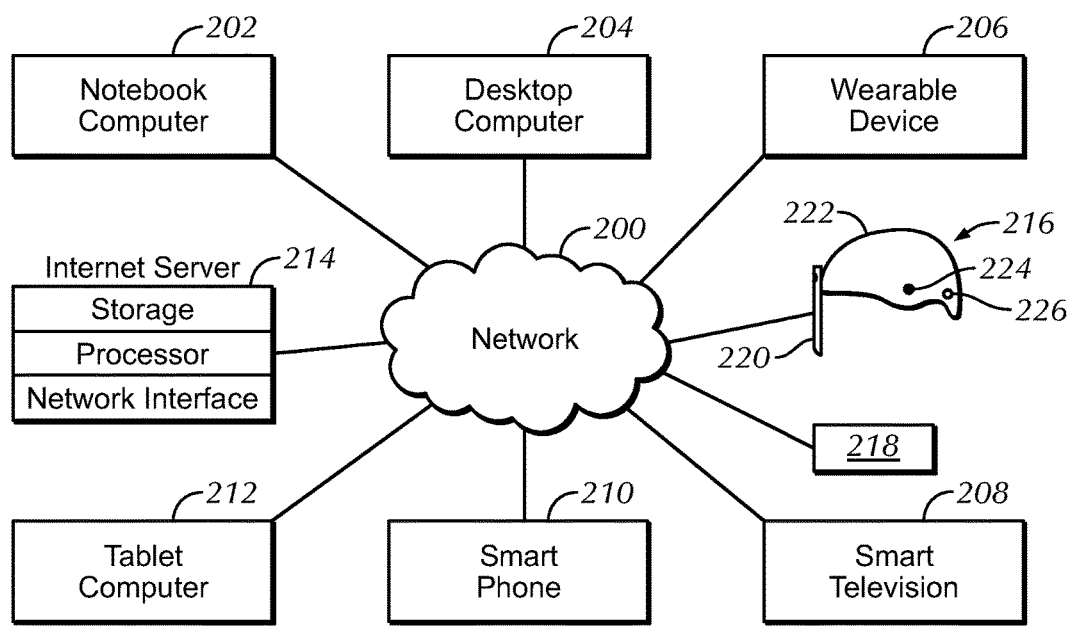
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, a console 218, and a server 214 such as an Internet server that may provide cloud storage accessible to the devices 202-212, 216, and 218. It is to be understood that the devices 202-218 are configured to communicate with each other over the network 200 to undertake present principles.

Describing the headset 216 in more detail, it may include a housing 222 to which a display device 220 is coupled for presenting virtual reality (VR) and/or augmented reality (AR) content as well as other information, images and video data. Thus, in some embodiments the display device 220 may include an at least partially transparent display through which a wearer of the headset may view real-world objects and on which the headset 216 may present AR objects, while in other embodiments the display device 200 may include a VR display.

The headset 216 may also a speaker 224 that may be similar in function and configuration to the speaker(s) 194, as well as one or more sensors 226, such as a camera or biometric sensor, for identifying a user of the headset 216. Note that though not shown for clarity, the headset 216 may include still other components such as a network interface for wired and/or wireless communication with the other devices of FIG. 2 via the Internet, a local area network (LAN), a Bluetooth network, etc.

Describing the console 218 in more detail, it may be a video game console with virtual reality and/or augmented reality processing capability for use in conjunction with the headset 216. Thus, the console 218 may include or communicate with one or more cameras for sensing eye movement of the user, for sensing gestures of the user, and for sensing objects within the environment in which the devices 216, 218 are disposed for AR and VR processing. The headset 216 may also include one or more cameras for such purposes. In any case, it is to be understood that the console 218 may also operate in conjunction with the headset 216 for data processing and the undertaking of the computer-implemented steps, instructions, and functions described herein. For instance, the console 218 may determine a user of the headset 216 using input from a camera on the console 218, and then stream content to the headset 216 based on the determination of the user.

Though not shown, it is to be understood that the console 218 may further include a network interface for wired and/or wireless communication with the other devices of FIG. 2 via the Internet, a local area network (LAN), a Bluetooth network, etc. Additionally, note that while a VR/AR headset is described above, other types of headsets may also be used in accordance with present principles, such as electronic glasses and other devices using so-called "heads up" displays and transparent displays.

Figure 3:
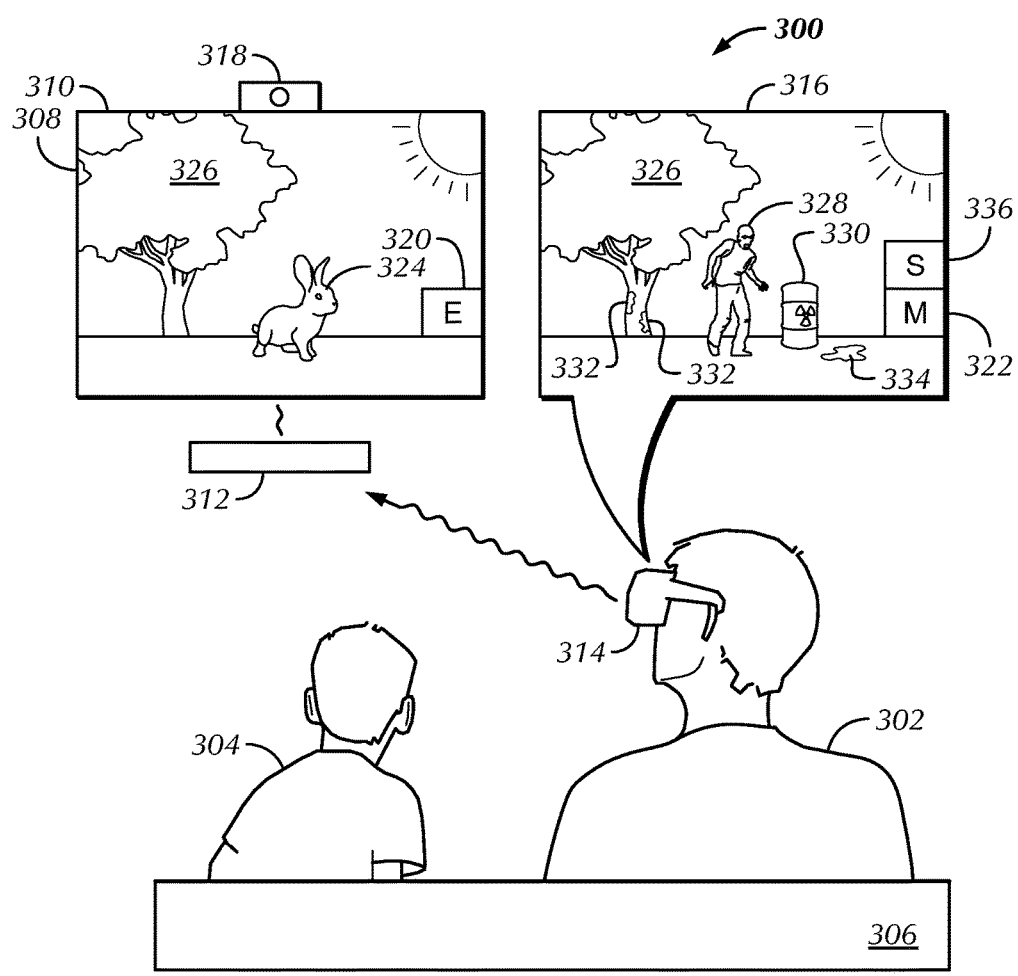
FIG. 3 is a perspective view of two users playing a video game in accordance with present principles.

Now referring to FIG. 3, a perspective view of an environment 300 is shown. The environment 300 may be, for example, the living room of a personal residence. A first user 302 and a second user 304 are shown sitting on a couch 306, with the second user 304 being younger than the first user 302. The users 302, 304 are understood to be playing a video game. A primary video game feed 308 is being presented on a television (TV) 310 under control of a video game console 312. Speakers on the TV 310 or other speakers controllable by the console 312 may have primary audio data streamed to them so that they can present primary audio for the video game.

FIG. 3 also shows that the user 302 is wearing a headset 314 such as a virtual reality (VR) headset, an augmented reality (AR) headset, or electronic glasses. Headset view 316 is understood to be a frame of what the user 302 sees while wearing the headset 314 and playing the video game using the display of the headset 314.

A camera 318 sits atop the TV 310 and can communicate with the console 312 to provide images taken by the camera 318 of the environment, including images of the users 302 and 304. Using the images from the camera 318, the console 312 may perform facial recognition to identify the users 302 and 304. The console 312 may identify the users 302 and 304 other ways as well, such as based on voice recognition using input from a microphone on the console 312 or, in the case of user 302, based on data sent from the headset 314 indicating the identity of the user 302 or otherwise usable to identify the user 302.

Based on identifying the users 302, 304 and any other users it is aware of in the environment 300, the console 312 may identify a maximum content rating for video game content that should be presented on the TV 310 on a scale from (for example) "everyone (E)" to "mature (M)", with "teen (T)" being a rating between "everyone (E)" and "mature (M)". In this example, the console 312 may identify users 302 and 304 and determine that, of the two, user 304 has a maximum content rating associated with him of "everyone" (as denoted by the "E" symbol 320 shown in the video game) that is lower than the maximum content rating associated with user 302, which is "mature" (as denoted by the "M" symbol 322 shown in the headset view 316). Based on this, the console 312 may select primary video game content (both audio and video) for presentation on the TV 310 that is of the "E" rating. However, based on the console 312 identifying the user 302 as being associated with "M" rated content, the console 312 may select secondary AR or VR content of an "M" rating along with corresponding "M" rated three-dimensional (3D) audio to be streamed to the headset 314 for presentation thereon.

It is to be understood that the primary and secondary content may both establish parts of the video game and can be included on a compact disc (CD) being read by the console 312, or the video game can be stored as an application or file on the console 312 itself. It is to also be understood that when a person is identified by the console 312 as being present in the environment 300, but that person either cannot be identified or does not already have a maximum content rating set for him or her, the console 312 may by default select primary video game content for presentation on the TV 310 that is of the lowest available rating, which in this case is of the "E" rating.

In any case, the "M" rated video game content is shown in headset view 316. As may be appreciated from FIG. 3, while the TV 310 shows a bunny 324 next to a tree 326 in the "E" rated primary video game content, a zombie 328 is shown in the headset view 316 not only next to the three 326 but also next to a radioactive drum 330 that is not shown in the primary video game content. Blood spots 332 on the trunk of the tree 326 and a mud puddle 334 are also shown only in the headset view 316.

Thus, while a portion of the "M" rated video game content shows the zombie 328 as replacing the bunny 324, other parts of the "M" rated video game content may supplement the primary content by being overlaid on the primary content, like the drum 330, spots 332, and puddle 334 in the headset view 316. The replacing and/or overlaying may be done at the headset 316 based on execution of augmented reality and/or virtual reality software in conjunction with the console 312 to present the "M" rated video game content in the headset view 316 using AR or VR. The "M" rated video game content may thus appear to the user 302 as either overlaid on the primary video game feed 308 as presented on the TV 310 in the case of AR being used with a transparent display on the headset 314, or as part of the virtual world as represented in the secondary VR content presented using the headset 314 in the case of VR being used with a VR display on the headset 314.

As the users 302, 304 play the video game, user 304 may use his video game controller to pet the bunny 324 in the primary content using one video game character while user 302 may use his video game controller to try to shoot the zombie 328 shown in the secondary content using another video game character. Additionally, the user 304 may also hear the primary audio associated with the primary video game content that is of the "E" rating (such as the sound of the bunny 324 hopping through the grass) as presented using the TV's speakers, while the user 302 may hear 3D audio of the zombie 328 making strange noises that is of the "M" rating as presented through headphones being worn by the user 302 and communicating with the console 312 and/or headset 314 to present the 3D audio.

If user 302 decides he wants to switch the rating for the video game content (both audio and video) presented using the headset 314 and hence switch to presentation of a differently-rated version of the video game using the headset 314, he may do so by selecting the selector 336 shown in the headset view 316. The selector 336 may be selected by the user 302 using his video game controller or based on eye input, for example. The selector 336 may be repeatedly selected to sequentially change presentation of the video game content using the headset 314 in the ratings scale from "E" to "T" to "M" and back to "E", and so on. In some embodiments, a "default" selector may even be presented in the headset view 316 that is selectable to automatically switch to presentation of the same video game content that is being presented on the TV 310 so that the user 302 can see what the user 304 sees via the TV 310 despite wearing the headset 314.

Figure 4:
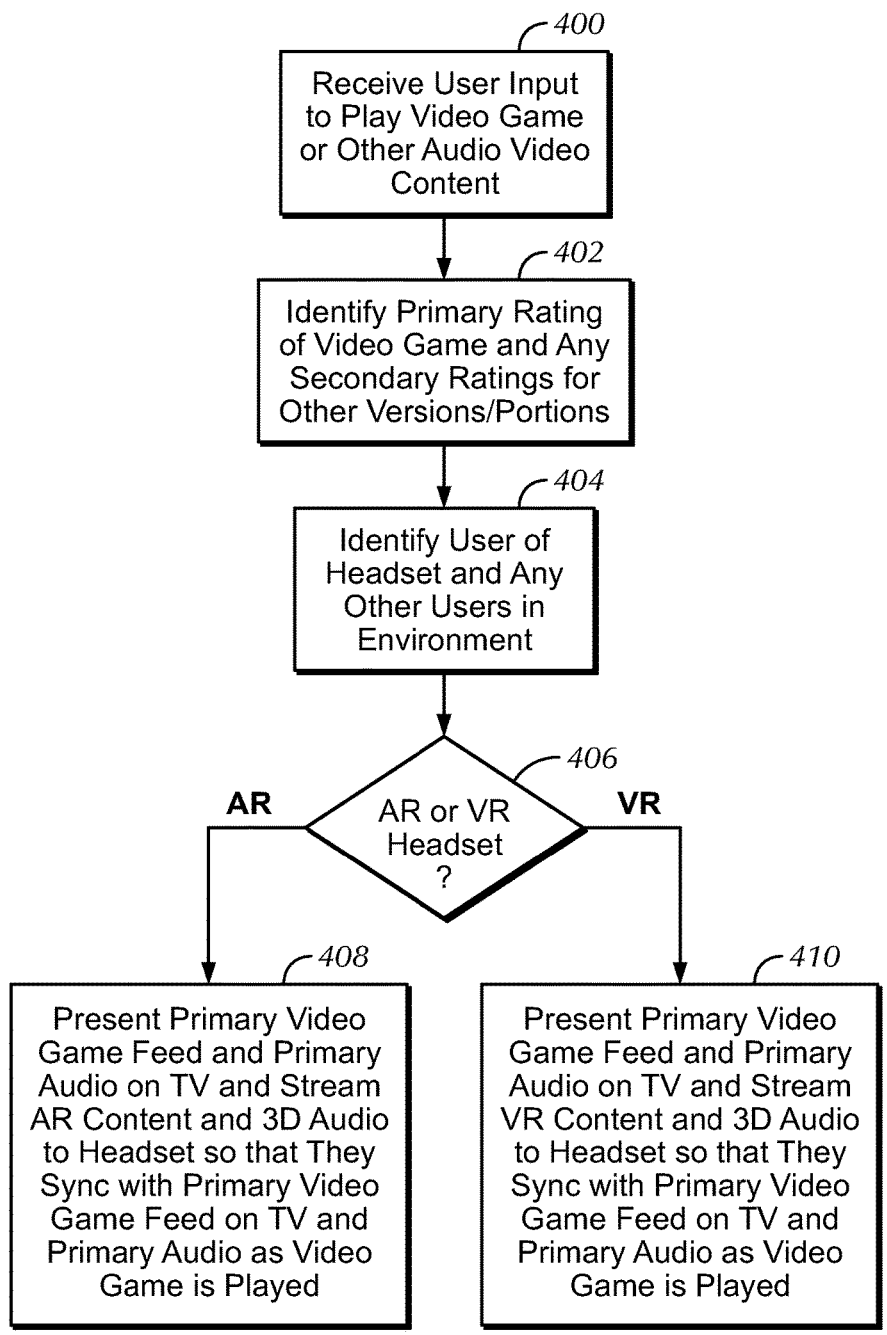
FIGS. 4 and 5 are flow charts of example algorithms in accordance with present principles.

Now referring to FIG. 4, it shows example logic that may be executed by a device such as the console 312 in accordance with present principles. Beginning at block 400, the logic may receive user input to play a video game or other audio video content such as a movie having content portions of various ratings. The logic may then move to block 402 where it may identify a primary rating of the video game (for portions that are to be presented on a TV) and secondary ratings for any other versions or portions of the video game that are to be presented using an AR or VR headset. In some examples, the console may access data it has stored or accessible to it that indicates the ratings for the various respective versions or portions.

From block 402 the logic may proceed to block 404 where the logic may identify a user of the headset. The logic may do so by receiving biometric data sensed using a biometric sensor at the headset, and then identifying the user by comparing the biometric data to one or more biometric templates for respective users to identify the user based on a match. The logic may also do so using facial recognition as described above in reference to FIG. 3 or based on images from a camera on the headset that show the user. Also at block 404, the logic may identify any other users in the console's environment.

The logic of FIG. 4 may then continue from block 404 to decision diamond 406, where the logic may determine whether the type of headset being used is an AR headset or a VR headset. This may be done based on data transmitted from the headset indicating headset type, based on data for the headset stored at the console indicating headset type, based on the console being configured to provide only AR or VR content, etc.

Based on the headset type being an AR headset (or otherwise based on the console determining that AR content is to be presented), the logic may move to block 408. However, based on the headset type being a VR headset (or otherwise based on the console determining that VR content is to be presented), the logic may move to block 410.

Describing block 408 first, at this step the logic may select video game content for presentation on the TV that has a rating corresponding to the lowest maximum rating of all users present in the environment. The logic may also select AR video game content for presentation at the headset that has a rating corresponding to the highest rating of content that the user of the headset is set or authorized to view. Then, also at block 408, the logic may present the primary video game feed and primary audio on the TV's display and speakers, respectively. The logic may also stream the AR content and 3D audio data to the headset under control of the console using, for example, audio/video player software and AR software. The AR content and 3D audio can thus sync up with the primary video game feed and primary audio, respectively, so that the TV and headset may simultaneously present the same point in time of the video game story.

Now describing block 410, at this step the logic may also select video game content for presentation on the TV that has a rating corresponding to the lowest maximum rating of all users present in the environment. The logic may also select VR video game content for presentation at the headset that has a rating corresponding to the highest rating of content that the user of the headset is set or authorized to view. Then, also at block 410, the logic may present the primary video game feed and primary audio on the TV's display and speakers, respectively. The logic may also stream the VR content and 3D audio data to the headset under control of the console using, for example, audio/video player software and VR software. The VR content and 3D audio can thus sync up with the primary video game feed and primary audio, respectively, so that the TV and headset may simultaneously present the same point in time of the video game story.

Figure 5:
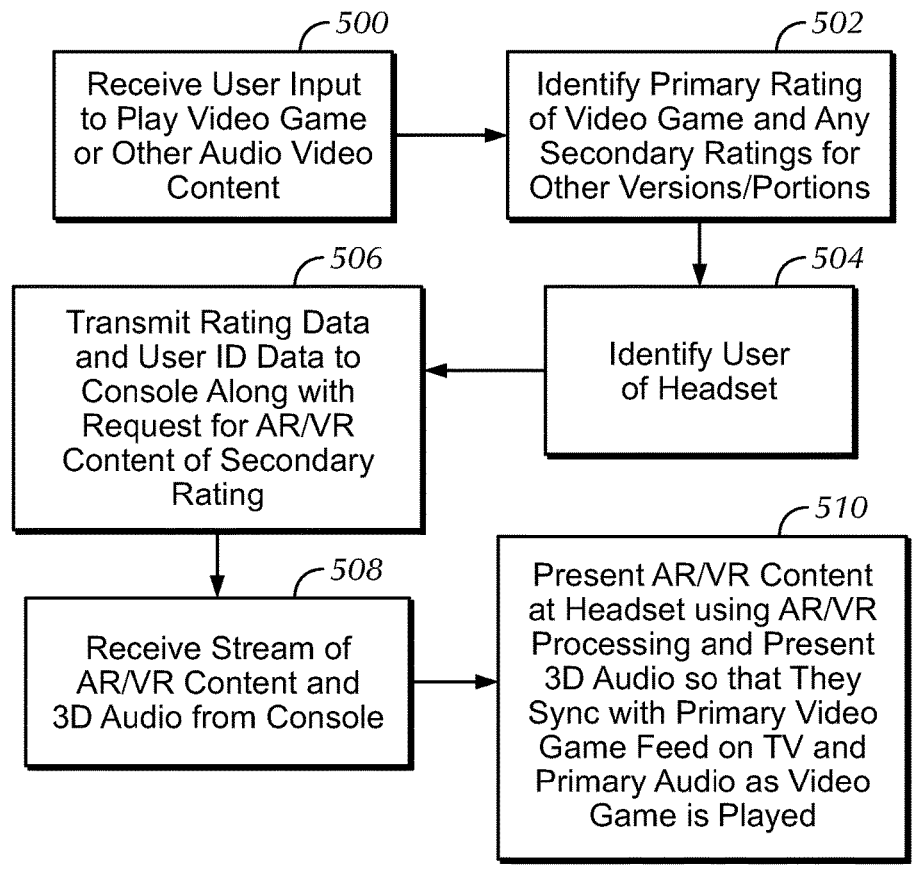

Continuing the detailed description in reference to FIG. 5, it shows example logic that may be executed by a device such as the headset 314 in accordance with present principles. Beginning at block 500, the logic may receive user input to play a video game or other audio video content such as a movie having content portions of various ratings, though this input may also be received at a console in communication with the headset as described in reference to FIG. 4 above.

The logic may then move to block 502 where it may identify a primary rating of the video game (for portions that are to be presented on a TV) and secondary ratings for any other versions or portions of the video game that are to be presented using AR or VR capabilities of the headset, though in some embodiments this step may also be performed by the console. In any case, the headset may access data it has stored at it or accessible to it that indicates the ratings for the various respective versions or portions.

From block 502 the logic may proceed to block 504 where the logic may identify a user of the headset. The logic may do so by receiving biometric data sensed using a biometric sensor on the headset, and then identifying the user by comparing the biometric data to one or more biometric templates for respective users to identify the user based on a match. The logic may also do so using facial recognition software and images from a camera on the headset that show the user.

After block 504 the logic may proceed to block 506. At block 506 the logic may transmit, to the console, rating data for the maximum rating of content the identified user is authorized to view or play in the video game. The logic may also transmit information to the console indicating the user's identity at block 506, along with a request for AR or VR content of the maximum rating for the identified user.

Next, the logic may move to block 508. At block 508 the logic may receive an AR/VR content stream with 3D audio data from the console via a wired communication link or a wireless communications link such as a Bluetooth or Wi-Fi direct. The logic may then proceed to block 510 where the logic may present the AR/VR video content at the headset using AR/VR software and present the 3D audio at the headset using stereo speakers thereon or using headphones connected to the headset. By receiving the stream and presenting it at the headset per, for example, timing data received from the console, the AR/VR content and 3D audio can sync up with the primary video game feed and primary audio presented using the TV so that the TV and headset may simultaneously present the same point in time of the video game story.

Figure 6:
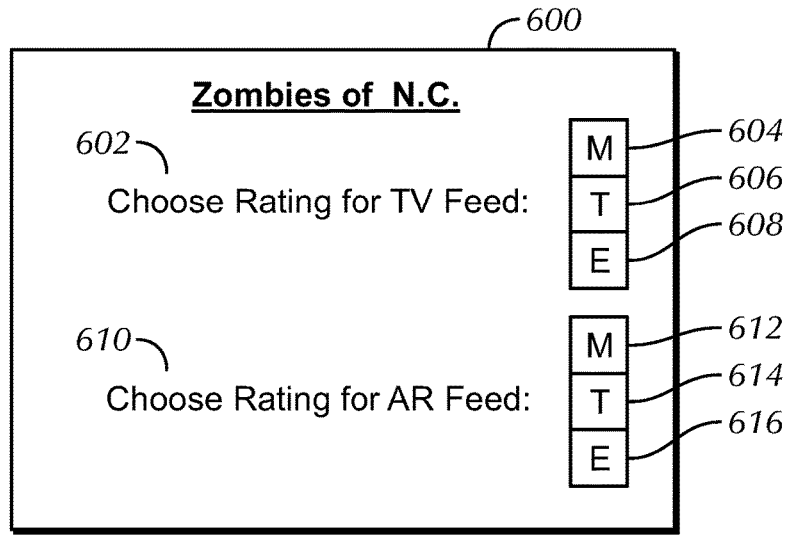
FIGS. 6 and 7 are example user interfaces (UIs) in accordance with present principles.

Now describing FIG. 6, it shows an example user interface (UI) 600 presentable on the display of a device such as a TV or a headset in accordance with present principles. The UI 600 may be for selecting parameters for presentation of a video game titled "Zombies of N.C.". A first option 602 is presented for a user to select a rating for primary audio and video content that is to be presented using a TV. Selectors 604, 606, and 608 are thus presented for the option 602 that are respectively selectable to select "M", "T", or "E" rated content for such purposes.

FIG. 6 also shows that a second option 610 is presented for a user to select a rating for secondary audio and video content that is to be presented using a headset. Selectors 612, 614, and 616 are thus presented for the option 610 that are respectively selectable to select "M", "T", or "E" rated content for such purposes.

Figure 7:
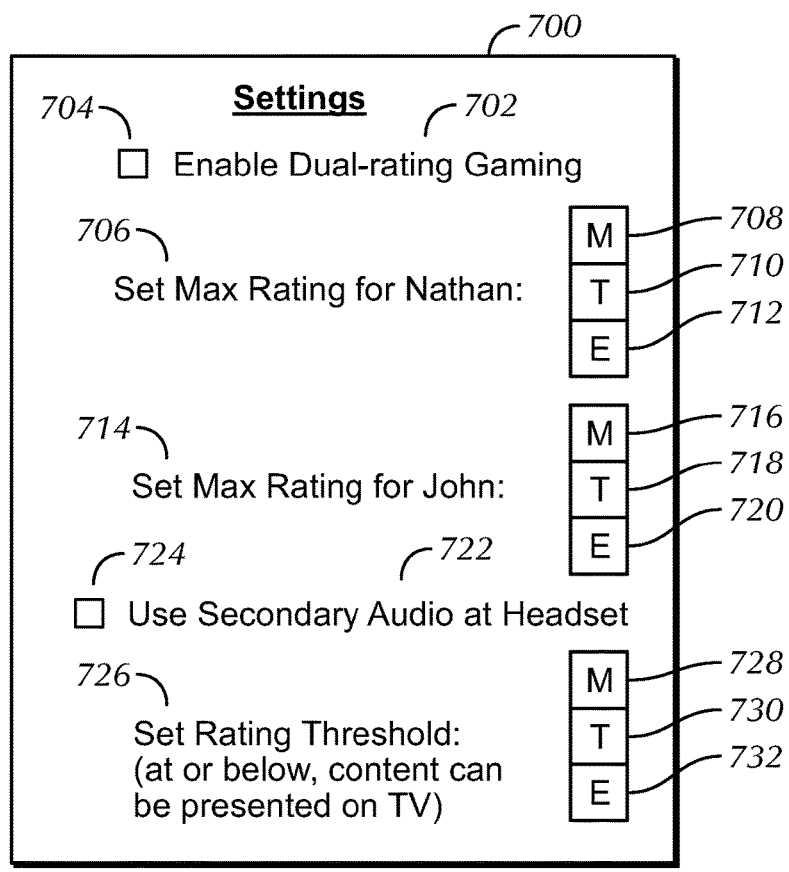

FIG. 7 shows another example UI 700 that may be presented on the display of a device such as a TV or a headset in accordance with present principles. The UI 700 may be for configuring settings for video game play or to be applied by a video game console while executing a video game. The UI 700 may include a first option 702 selectable using check box 704 to enable "dual-rating" gaming as described herein where primary content may be presented using a TV and secondary content may be presented using a headset.

The UI 700 may also include a second option 706 to set a maximum rating of content that user "Nathan" is authorized to view either on a TV or using a headset as described herein. Selectors 708, 710, and 712 are thus presented for the option 706 that are respectively selectable to select "M", "T", or "E" rated content for such purposes.

An option 714 is also shown to set a maximum rating of content that user "John" is authorized to view either on a TV or using a headset as described herein. Selectors 716, 718, and 720 are thus presented for the option 714 that are respectively selectable to select "M", "T", or "E" rated content for such purposes.

The UI 700 may also include an option 722 selectable using check box 724 to enable presentation of secondary audio at the headset instead of, for example, presenting a 3D audio version of the primary audio at the headset. Yet another option 726 may be included on the UI 700, with the option 726 being to set a rating threshold so that only content at or below the rating may be presented using the TV and no content higher than the rating may be presented using the TV regardless of users in the TV's environment. This may be done so that, for example, should a child walk into the environment unexpectedly, the child will not unintentionally be exposed to content rated higher than the child's age level. Selectors 728, 730, and 732 are presented for selection to respectively establish the threshold at "M", "T", or "E" rated content for such purposes.

Before concluding, it is to be understood that although a software application for undertaking present principles (as well as video games in accordance with present principles) may be vended with a device such as the system 100, present principles apply in instances where such applications (and games) are downloaded from a server to a device over a network such as the Internet. Furthermore, present principles apply in instances where such applications (and games) are included on a computer readable storage medium that is being vended and/or provided (such as a compact disc), where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A headset, comprising:
a housing;
at least one processor coupled to the housing;
a first display coupled to the housing and accessible to the at least one processor; and
storage coupled to the housing and accessible to the at least one processor, the storage bearing instructions executable by the at least one processor to:
identify a rating associated with content a first portion of which is being presented on a second display and/or will be presented on the second display, the content comprising a video game;
identify a user of the headset;
based on the identification of the rating and based on the identification of the user, transmit data to a device;
receive a second portion of the content at the headset;
present, at least in part using the first display, the second portion at the headset; and
present, via the first display, a selector that is selectable to provide a command to switch to presentation, at the headset, of the first portion instead of the second portion.

2. The headset of claim 1, wherein the transmission of the data to the device comprises transmission of a request for at least video data associated with the content.

3. The headset of claim 1, wherein the transmission of the data to the device comprises transmission of information pertaining to the user.

4. The headset of claim 1, wherein the rating is a mature rating, and wherein the second portion is streamed to the headset as the video game is played.

5. The headset of claim 1, wherein the rating is a first rating, wherein the first portion of the content is associated with a second rating different from the first rating, and wherein the second portion is associated with the first rating.

6. The headset of claim 1, wherein the first display is an at least partially transparent display, and wherein augmented reality processing is used to present the second portion at least in part using the first display so that the second portion appears, to the user while wearing the headset, overlaid on at least some of the first portion as presented on the second display.

7. The headset of claim 1, wherein the first display is a virtual reality (VR) display, and wherein VR processing is used to present the second portion at least in part using the first display.

8. The headset of claim 1, wherein the rating is a first rating associated with the first portion, wherein the second portion is associated with a second rating that is different from the first rating, and wherein the selector is selectable to switch between respective portions of the content of different ratings.

9. The headset of claim 1, wherein the selector is a first selector, and wherein the instructions are executable by the at least one processor to:
present, via the first display, a second selector that is selectable to enable the headset to present portions of content on the first display that have a different rating than other portions of the same content presented on another display.

10. A method, comprising:
identifying a rating for content, with a first portion of the content being presented on a first display and/or to be presented on the first display, the content comprising a video game;
identifying a user of a headset;
transmitting, based on the identifying of the user, a second portion of the content to the headset;
receiving user input to switch to presenting, via the headset, the second content, the user input being received based on selection of a selector presented via the headset; and
transmitting, responsive to receipt of the user input, the first portion of the content to the headset.

11. The method of claim 10, comprising:
transmitting, based on the identifying of the user and based on the identifying of the rating, the second portion of the content to the headset.

12. The method of claim 11, wherein the rating is a first rating, wherein the first rating is associated with the second portion, and wherein the method comprises:
presenting the first portion of the content on the display based on identification of a second rating associated with the first portion of the content.

13. The method of claim 10, wherein the second portion of the content comprises first video data and first audio data, the first video data being different from second video data establishing part of the first portion, the first audio data being different from second audio data establishing part of the first portion.

14. The method of claim 10, wherein the selector is presented via a second display disposed on the headset.

15. The method of claim 10, wherein the selector is a first selector, and wherein the method comprises:
presenting a second selector that is selectable to enable the headset to present portions of content that have a different sating than other portions of the same content presented at another device.

16. A computer readable storage medium (CRSM) that is not a transitory signal, the computer readable storage medium comprising instructions executable by at least one processor to:
determine a user of a headset;
stream, based on the determination of the user, first content of a first rating to the headset for presentation at the headset concurrently with presentation of second content on a first display separate from the headset, the second content being of a second rating different from the first rating, the first content and the second content both being associated with a video game;
receive user input to switch to presentation, via the headset, of the second content, the user input being received based on selection of a selector presented via the headset; and
stream, responsive to receipt of the user input, the second content of the second rating to the headset.

17. The CRSM of claim 16, wherein the first content comprises audio data and video data both of the first rating.

18. The CRSM of claim 16, wherein the instructions are executable by the at least one processor to determine the first content based on a headset type with which the headset is associated.

19. The CRSM of claim 16, wherein the selector is presented via a second display disposed on the headset.

20. The CRSM of claim 16, wherein the selector is a first selector, and wherein the instructions are executable by the at least one processor to:

present a second selector that is selectable to enable the headset to present portions of content that have a different rating than other portions of the same content presented via another device.

21. A device, comprising:

at least one processor; and storage accessible to the at least one processor and bearing instructions executable by the at least one processor to:

determine a user of a headset;

stream, based on the determination of the user, first content of a first rating to the headset for presentation at the headset concurrently with presentation of second content on a first display separate from the headset, the second content being of a second rating different from the first rating, the first content and the second content both associated with a video game;

receive user input to switch to presentation, via the headset, of the second content, the user input being received based on selection of a selector presented via the headset; and stream, responsive to receipt of the user input, the second content of the second rating to the headset.

22. The device of claim 21, wherein the instructions are executable by the at least one processor to:

identify a rating associated with the second content; and stream the first content to the headset based on the determination of the user and the identification of rating associated with the second content.

23. The device of claim 21, wherein the first content is content that replaces at least one aspect of the second content and/or supplements at least one aspect of the second content.

24. The device of claim 21, wherein the selector is presented via a second display disposed on the headset.

25. The device of claim 21, wherein the user is a first user, and wherein the instructions are executable by the at least one processor to:

determine that a second user cannot be identified and/or that the second user does not have a content rating associated with him or her; and based on the determination that the second user cannot be identified and/or that the second user does not have a content rating associated with him or her, present on the first display a lowest-rated version a video game associated with both the first content and the second content.

26. The device of claim 21, wherein the selector is a first selector, and wherein the instructions are executable by the at least one processor to:

present a second selector that is selectable to enable the headset to present portions of content that have a different rating than other portions of the same content presented via another device.

* * * * *